United States Patent [19]
Robson

[11] Patent Number: 4,739,531
[45] Date of Patent: Apr. 26, 1988

[54] BEE VENOM COLLECTION APPARATUS

[76] Inventor: Charles H. Robson, 6241 S. 30th St., Phoenix, Ariz. 85040

[21] Appl. No.: 892,270

[22] Filed: Aug. 4, 1986

[51] Int. Cl.⁴ .................... A01K 47/06; A01K 55/00
[52] U.S. Cl. ........................................ 6/12 R; 6/4 R
[58] Field of Search ...................... 6/4 R, 12 R, 12 M

[56] References Cited
U.S. PATENT DOCUMENTS
3,163,871  1/1965  Palmer ................................. 6/12 R
4,254,519  3/1981  Vick et al. ............................ 6/12 R FOREIGN PATENT DOCUMENTS
663355  5/1979  U.S.S.R. ............................. 6/12 R
718066  2/1980  U.S.S.R. ............................. 6/12 R Primary Examiner—Robert P. Swiatek
Attorney, Agent, or Firm—Joseph H. Roediger

[57] ABSTRACT

Apparatus for the production and collection of bee venom by the use of electrical conductors disposed in the colony with a fibrous pad therebelow. A square wave voltage is applied to adjacent conductors to excite bees and cause them to deposit venom in the underlying pad.

8 Claims, 2 Drawing Sheets

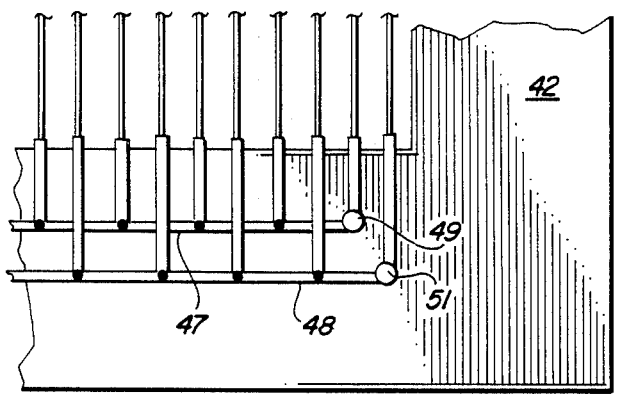
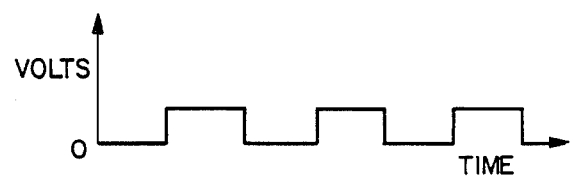
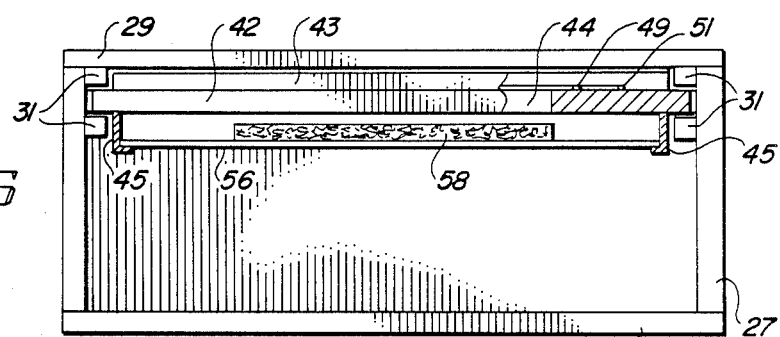
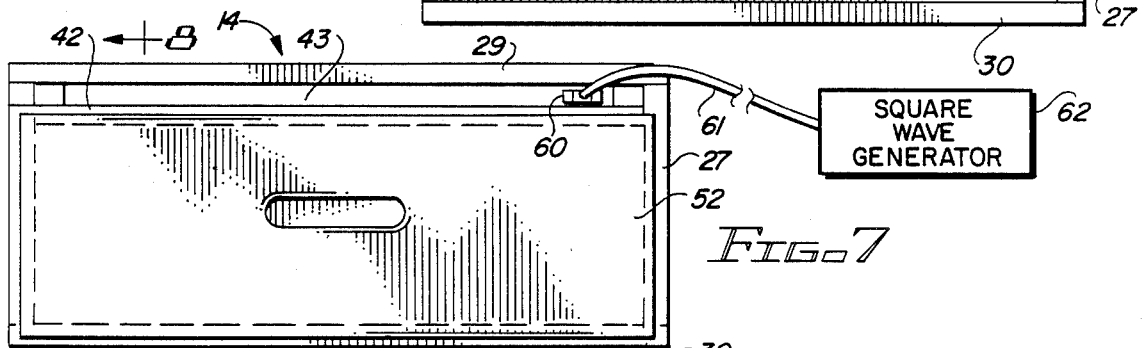
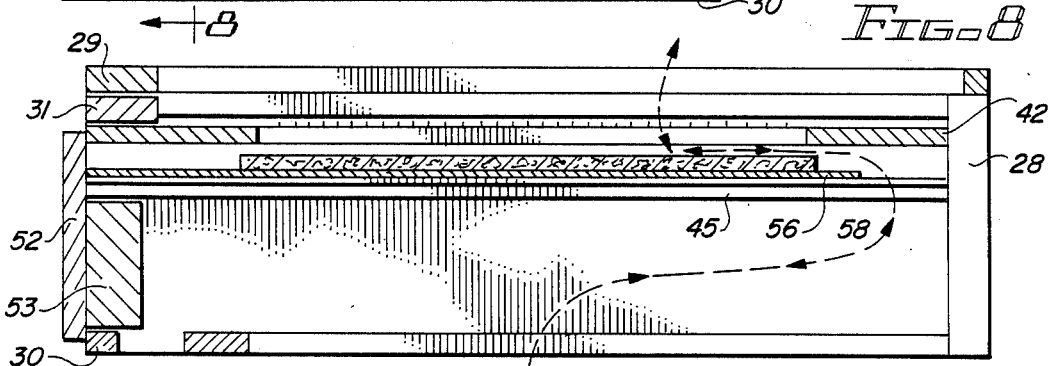
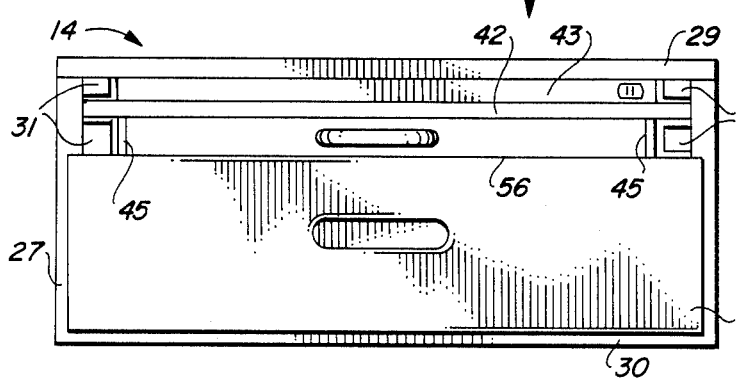

BEE VENOM COLLECTION APPARATUS

BACKGROUND OF THE INVENTION

This invention relates to an apparatus utilized for promoting and controlling the production of bee venom in a honey bee colony and enhancing the collection thereof.

The honey bee depends on pollen gathered from plant life for its protein requirement and on the honey that it manufactures for its carbohydrate food component. The bees collect and store these products in a colony so that it is later available during periods of short supply. Recently, the nutritional benefits of honey and pollen have been recognized as being highly beneficial to the human diet. This recognition has generated increasing interest in ways to efficiently and effectively manage a bee colony so as to harvest the bee products.

Typically, a colony structure includes a plurality of vertically stacked supers containing combs for receiving honey to form a segmented colony structure. Included in this colony structure is an entry member included in the base member and typically elevated above the surface of the ground to provide ingress and egress to the overlying stack of hives or supers. The large number of commercial bee operations in this country have resulted in the standardization of the dimensions of the colony structure with the result that most of the apparatus is interchangeable when positioned in a colony structure.

Thus, any additional devices utilized in gathering products from the honey bee colony should be designed so as to conform to these dimensions in order to promote usage. One device marketed as the ROB-BEE pollen trap is described in U.S. Pat. No. 4,351,074, wherein a pollen trap is dimensioned to fit in the stack of hives forming the segmented bee colony. In addition, a propolis gathering device has been designed to be incorporated within the pollen trap and is the subject of U.S. Pat. No. 4,454,616. Both of these devices are manufactured and sold by the Robson Honey & Supply Company of Phoenix, Ariz.

Another product of the bee colony which is of commercial interest is the venom manufactured by and contained within the bee. Since the bee normally releases venom only after excitation, it is important to control the excitation and release of venom so that it occurs in a restricted environment. Research has been done in the past concerning different methods of provoking bees to reach the excitation stage wherein they release venom. One of these methods is described in United Kingdom Pat. No. 507,269, granted to Forster, et al., and details a mechanical approach toward excitation and venom collection wherein rollers are drawn towards one another so that the bees are subjected to pressure but not maimed or killed. When so agitated, the bees discharge their venom into materials such as felt or other woven materials. This reference teaches the use of woven materials in a large area web configuration disposed over rollers so that the bees release venom by stinging moving woven fabrics. This approach more often than not causes the bee stinger to remain lodged in the material, thus causing death of the bees.

Further research described in the publication BEE WORLD, Vol. 42, No. 9 (Sept. 1961) by D. J. Palmer, outlines studies showing that honey bees will sting if subjected to electric shock. In laboratory tests described in that paper, bees were withdrawn from a colony and placed in proximity to a gel containing electrical connections which produced a current flow through the gel. As a result of excitation by means of an electrical current, the researchers were able to gather sufficient venom to conduct laboratory experiments on venom.

At present, several topical ointments are now in commercial production which utilize bee venom, primarily for arthritic joint pain in humans. In addition, allergenic studies have shown that a larger portion of the population than heretofore recognized is stongly allergic to the sting of a bee and, in many cases, this can be a life threatening experience since it has the capability of inducing a state of shock in the patient. In order to prepare antivenom to desensitize and treat this portion of the population, it is necessary to gather a significant quantity of venom for processing.

Accordingly, it is an object of the present invention to provide venom collection apparatus for inclusion in a conventional bee colony. The apparatus is constructed so as to not require modification of the external colony structure. Also, the invention is directed to the provision of a medium for essentially eliminating the death of the excited bees through entanglement with the receiving medium. In addition, both the level and duration of the excitation of the bees is externally controlled to prevent unwanted over-excitation of the colony. Further, by utilizing existing equipment available to the bee keeper, the individual keeper is able to generate additional income through the harvesting of venom without disturbing the structures used to gather other hive products now being gathered and marketed.

SUMMARY OF THE INVENTION

The present invention is directed to bee venom collection apparatus which is dimensioned to fit within a conventional segmented bee colony to thereby permit the bee keeper to engage in venom collection according to his preferred manner of hive operation without significantly altering the collection of other hive products.

Typically, the segmented bee colony includes an entry level base member with a plurality of supers stacked thereupon in a vertical manner. Also, a housing member dimensioned to fit within the segmented vertical stack is adapted to receive a pollen trap. The pollen trap does not prevent the honey bee from moving vertically in the internal passage between hive entrance and overlying supers, except under circumstances wherein the supers are intentionally segregated or sealed off from the environment. In a preferred embodiment, the present invention is intended to be utilized in combination with a housing member adapted to receive a pollen trap contained therein.

The present apparatus is dimensioned for placement in a bee colony structure and includes a frame means adapted for placement in the internal passage between the hive entrance and the stacked colony supers. The frame means contains a centrally-located opening therein to accommodate the movement of bees to different segments of the structure.

A multiplicity of spaced electrical conductors are placed across the opening in the frame means and adjacently spaced so as to permit the passage of bees therethrough. The spacing being such that it is likely that the bee will contact a conductor as he passes by it. In addition, the apparatus includes control means for establishing a voltage difference between adjacent conductors whereby bees passing therebetween and encountering conductors are electrically stimulated when venom collection is taking place. In addition, placed below the frame means with its array of spaced conductors is a collection means adapted for removable insertion in the housing. The collection means includes a fibrous pad spaced below the conductors for receiving the attack of the excited bee and collecting the venom secreted thereby. A support base is provided for the fibrous pad which is also accessibly mounted in the housing to permit removal of the pad and its supporting base from without the housing. Thus, the apparatus can be placed within the segmented bee colony structure and withdrawn in whole or in part as the case may be.

The housing dimensioned to fit within a conventional segmented bee colony for receiving both the frame means and collection means is provided with an open wall having horizontally extending guides on the side walls thereof to receive the frame member. Also, the collection means is removably mounted in guides which extend along the underside of the frame member. The guides space the collection means from the overlying frame means so as to maintain access to the opening in said frame member for the bees. As the bees pass through the opening, they encounter the electrical conductors. Underlying the electrical conductors and spaced therefrom is the fibrous pad constructed of a synthetic material and compressed together in a loose-weave pad of fibers to reduce the likelihood of the bee encountering an obstacle to withdrawal of his anatomy during the process of stinging the fibrous pad and therefore being killed.

In operation, the conductors are energized by an external voltage source which provides a wave form having a variable and limited duty cycle so as not to over-exercise the bees in proximity to the conductors. At the termination of the period of operation, the voltage source is removed and the collection means withdrawn from its position beneath the frame member in the colony structure. The pad is then replaced with the pregnant pad being taken to a processing facility for the removal of bee venom thereon.

Further features and advantages of the invention will become more readily apparent from the following detailed description of a specific embodiment when taken in conjunction with the accompanying drawings.

BRIEF DESCRIPTION OF THE DRAWINGS

FIG. 5 is an enlargement of a portion of the frame member as shown in FIG. 4.

FIG. 6 is a front view of the embodiment in FIG. 5 in partial section with the front panel removed.

FIG. 7 is a front view of the embodiment shown in FIG. 6 with full front panel member.

FIG. 8 is a cross-sectional view taken along line 8—8 in the embodiment of FIG. 7.

FIG. 9 is a front view with a partial front panel member.

FIG. 10 is a waveform suitable for use in the present invention.

DESCRIPTION OF THE PREFERRED EMBODIMENT

Figure 1:
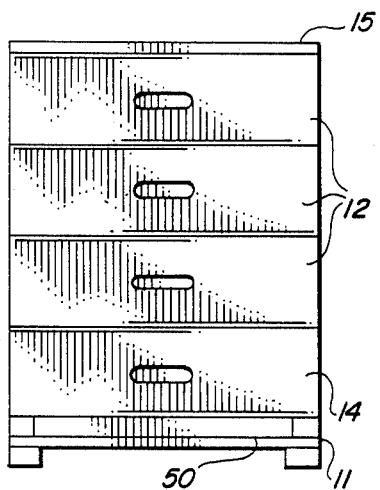
FIG. 1 is a front view of a segmented colony structure.

Referring now to FIG. 1, a segmented bee colony is shown including an elevating support base 11 with a number of supers or hive segments 12 placed thereon. A first housing member 14 is positioned at the bottom of the vertical stack of supers and is dimensioned to receive the pollen trap therein as described in U.S. Pat. No. 4,351,074 to Charles H. Robson. As shown, a lid is placed on the uppermost super to complete the colony structure. In use, access to the interior of the hive body is controlled by blocking member 50 which can be inserted into the opening in supporting base 11, as shown in more detail in FIG. 3. When the blocking member is removed, the bees travel vertically through the central or internal passage in the hive body and enter or exit through the horizontal opening in supporting base 11.

Figure 3:
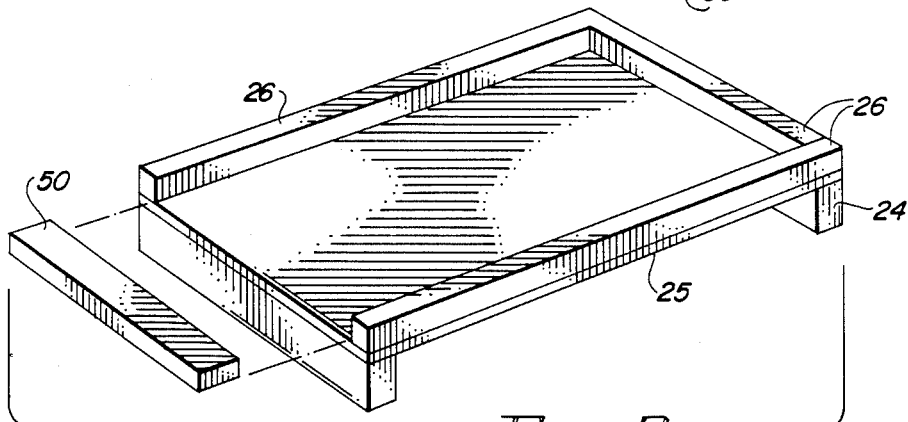
FIG. 3 is a perspective view of an elevating supporting base for the colony structure of FIG. 1.

The elevating base structure of FIG. 3 includes supporting legs 24, which rest on the ground and elevate the baseboard 25 from ground level. The three edge supports 26 are mounted on the baseboards so as to provide the bee entry opening at one end of the supporting base. As a general rule, it is good practice to elevate the hive body from the ground moisture and permit the passage of air thereunder. In different regions of the country, it is common to affix the supporting base permanently to the bottom hive segment in the colony structure with additional hive segments placed thereon. The following description of a preferred embodiment is with reference to a housing segment for receiving the subject invention which is mounted directly upon the elevating base, although it is to be recognized that the segment could be inserted at different locations within the colony structure as desired.

Figure 2:
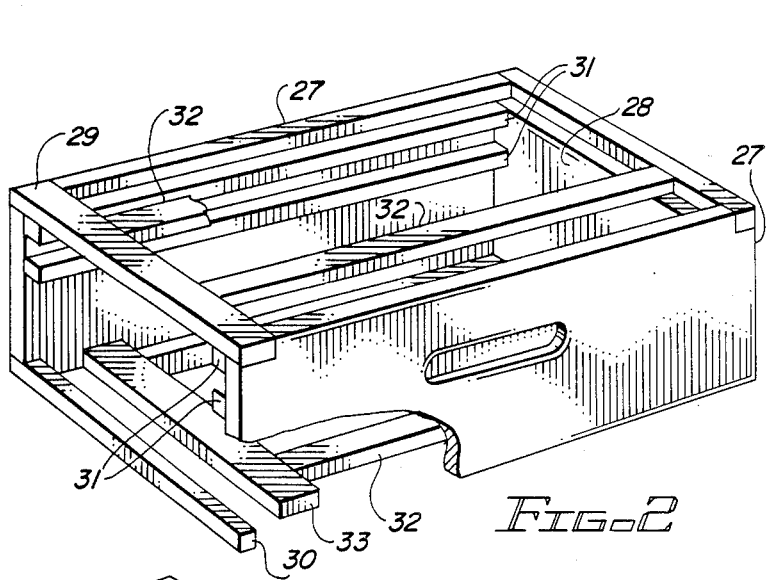
FIG. 2 is a perspective view in partial section of a housing member suitable for use in connection with a perferred embodiment of the invention.
Figure 4:
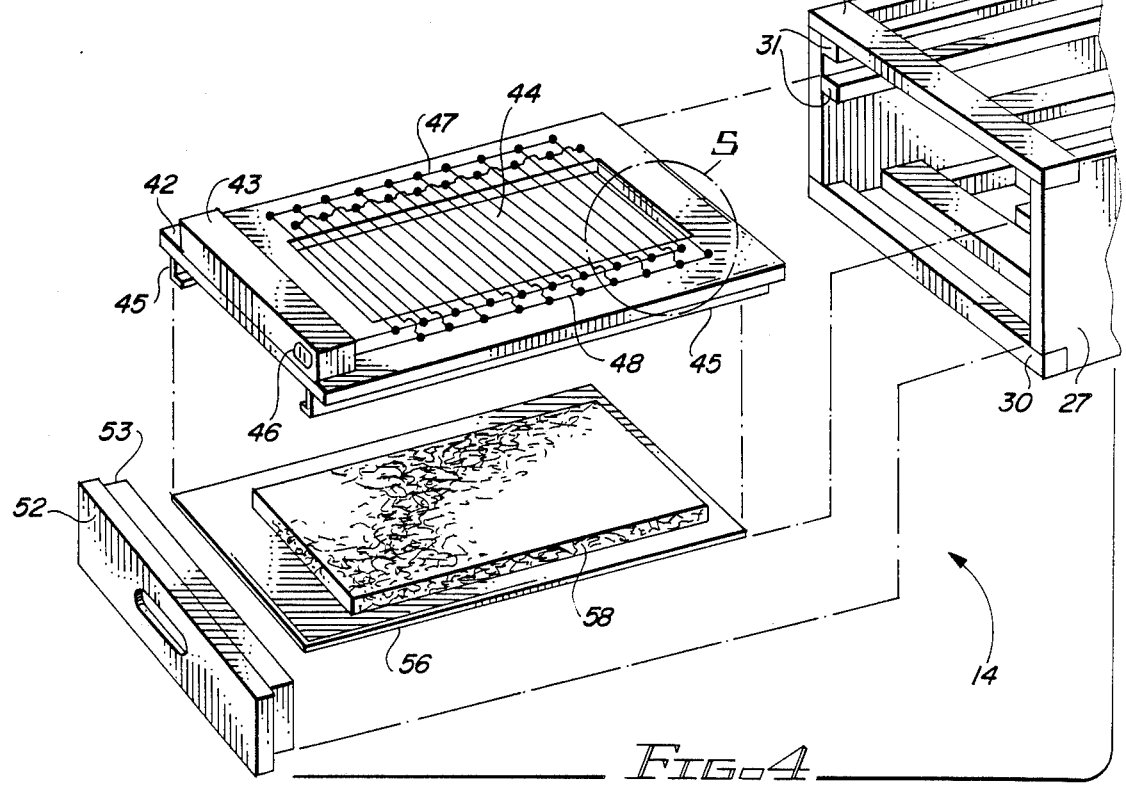
FIG. 4 is a perspective view of the frame member underlying collection means and front panel utilized in the preferred embodiment of the invention.

A housing member 14, as shown in FIG. 1, is set forth in the perspective view of FIG. 2, wherein the housing is formed with opposing sidewalls 27, back wall 28 and front wall supports 29 and 30. The housing means is dimensioned to fit in the segmented colony structure. The top and bottom of the housing member 14 are open to permit movement of the bees in a vertical direction. Structural support is provided by pairs of longitudinal members 32 extending along the top and bottom of the housing member. Also, a pair of spaced longitudinal guides 31 are secured to each sidewall 27 to slidably receive the frame means 42 as shown in FIG. 4. Referring now to FIG. 4, the front wall supports 29 and 30 and the front edges of sidewalls 27 define the opening in housing member 14. A planar frame member 42 is dimensioned to fit within the longitudinal guides 31, and extends between the sidewalls 27. When the frame member 42 is inserted into the housing member, blocking member 43 occupies the space between the planar frame 42 and the overlying front wall support 29 thus preventing the ingress and egress of bees from the hive colony at this location. Planar frame member 42 is provided with a centrally located opening 44. Two sets of adjacently spaced exposed electrical conductors 47 and 48 extend transversely across the central opening at a spacing which is less than the typical length of a honey bee. In practice, this spacing is one-quarter of an inch. As shown in FIG. 4, the conductors extend to the front of the planar member 42 and terminate in receptacle 46 formed in blocking member 43. As will later be described, external electrical connection to a voltage source is made via receptacle 46.

The underside of planar member 42 contains L-shaped guides 45 extending longitudinally to the back edge thereof. The spacing between guides 45 is such that they can be accommodated between the lower longitudinal guides 31 secured to the opposing sidewalls 27 of housing member 14. Thus, the insertion and withdrawal of planar frame member 42 into housing 14 is not limited by the presence of the guides 45. In operation, a support base 56, dimensioned to fit slidably within and be supported by guides 45, is placed therebetween. The support base 56 does not extend the full length of the housing 14 in order to permit bees traveling in the vertical passageway within the bee colony structure to move freely therearound. The support base can be readily inserted and withdrawn from housing member 14 independent of planar member 42.

A fibrous pad 58 formed of a loose-weave inert synthetic material, for example, Teflon, is supported on base 56 beneath the central opening 44. When the support base and pad thereon are positioned beneath the planar member 42 in housing 14, bees traveling in the hive colony structure pass between the back wall 28 of housing 14 and the edge of support 56 to encounter the spaced exposed conductors 47 and 48 extending across central opening 44. In order to prevent the undesired movement of bees out of the colony structure at this point, the access means defined by the region between front wall support 29 and support member 56 is sealed off by the action of blocking member 53 and cover plate 52 which can be positioned in the front wall of the housing to deny passage to the bees through the access means. The cover plate 52 having a central depression to facilitate handling is affixed to the blocking member 53 so as to permit it to be readily inserted and withdrawn from the access means in the housing 14.

The constructional aspects of the electrical conductors 47 and 48 are shown in the partial plan view of FIG. 5, wherein the parallel longitudinal conductors 47 and 48 extending from the receptacle 46 are shown supported at insulating posts 49 and 51, respectively with the spaced adjacent conductors extending across the central opening in member 42 to similar connections on the opposing side. As shown, the conductors are insulated except when they extend across the central opening. When a voltage is placed between conductors 47 and 48, a potential difference exists between adjacent exposed conductors throughout the central opening in planar member 42. Thus, any bees coming into contact with adjacent conductors experience an electrical stimulus and are excited thereby to drop down and inject venom into the porous pad.

In FIG. 6, a front view of housing 14 with the planar member 42 positioned therein and the support base 56 with fibrous pad thereon in its underlying position is shown with the blocking member and cover plate removed. From the cutaway portion in the top right-hand corner of FIG. 6, the spatial relationship between the conducting wires extending across opening 44 and the underlying fibrous pad 58 is clearly shown. When the bees traveling in the central vertical passageway of the colony structure pass behind support base 56 and then seek to pass through central opening 44, they encounter the exposed electrical conductors and are stimulated by the voltage therebetween. During operation, the bees are found to inject venom via their stingers into the fibrous pad 58. Over a period of time and after repeated stings, the venom build-up in pad 58 begins to crystalize or solidify, thus permitting it to be retained by the pad as a carrier for subsequent processing. The removal of the pad is effected by the removal of its support base 56 to a remote location with the pad containing the crystalized venom placed in a suitable solvent. Subsequent processing of the dissolved venom is carried out by conventional processing techniques.

In operation, the cover plate 52 and its associated blocking member 53 are effective in closing off the access means into housing 14 as shown in FIG. 7. A voltage source such as square wave generator 62 is connected via cable 61 and external connection 60 to the receptacle in blocking member 43. The square wave generator provides a voltage output signal having the waveform as shown in FIG. 10. By using a square wave generator, the voltage applied between adjacent exposed conductors extending across central opening 44 is intermittent with the duty cycle determining the relative on-off periods. In FIG. 10, a 50% duty cycle is shown. In practice, the magnitude of the waveform and the duty cycle are determined after installation to provide effective collection of venom in a given period of time without harming the health of the honey bee colony. While a DC voltage difference has been maintained for substantial periods of time, the best results have been obtained with square waveform voltage signals applied to the conductors. Even with the use of the square wave generator, it is desirable to limit the period of operation based on the season and strength of the bee colony.

A cross-sectional view of the housing 14 in FIG. 7, with the front blocking means in position, is shown in FIG. 8 wherein the dashed line indicates a likely travel path for a honey bee moving in the vertical direction within the colony structure. It is important to note that the vertical distance between the bottom surface of planar member 42 and the top surface of support 56 is sufficient to accommodate both the fibrous pad and to provide sufficient airspace for the movement of the bees. This is especially important at the edges of the pad which underlie the frame member. In the central area of the pad there is the additional vertical space provided by the central opening so that the bees have substantial room to move about before encountering the exposed conductors. When the venom collection apparatus is not to be placed in use for a long period of time, the planar member 42 and the pad and support are normally withdrawn and stored elsewhere. It is to be noted that a larger front or cover plate on the block member 43 is then required in order to insure that the bees exit only through the supporting base 11. These structural parts of the apparatus can be readily withdrawn without dissembling the colony structure and if the housing 14 is located directly on the supporting base 11, the front wall can be left open to provide an additional port, if desired.

Another embodiment is shown in FIG. 9, wherein an upward front flange is intentionally provided at the front of the support 56 to thereby form a portion of the front wall of housing 14. This facilitates withdrawal of the support and pad from the housing for cleaning and venom collection. Thus, the support base 56 and pad 58 are readily accessible to the bee keeper without disturbing any other elements of the hive structure. As shown, access to the hive structure above the planar frame member 42 is limited by blocking member 43 affixed thereto.

Although the prior description has referred to a partial withdrawal of the support base and porous pad with the lifting off of the pad and transporting same to a processing facility, an integral support base and porous pad could be used, if desired, with both elements being withdrawn and immersed in the solvent bath as a unit. Other embodiments successfully operated have utilized plastic frame members and support bases. If desired, an overlying protective shield can be placed over and spaced from the central opening on the frame to protect the conductors from the overlying supers. However, periodic cleaning of the apparatus is preferred. The operation of the above-described invention has been found to promote venom collection with a substantially reduced risk of harm to the bees forming the colony since the stimulation and collection take place within the hive colony structure itself. Furthermore, the use of intermittent voltage waveforms is believed to reduce the stress on the individual bees allowing them time to recover after releasing their venom in the porous pad and to continue on in an upward direction to the overlying supers.

While the foregoing description has referred to specific embodiments of the invention, it is recognized that many modifications and variations may be made therein without departing from the scope of the invention, as claimed.

What I claim is:

1. Venom collection apparaus for placement at different levels within a segmented bee colony structure, said apparatus comprising:
   (a) a housing member having a front wall, opposing sidewalls and a back wall and being dimensioned to fit within the segmented colony structure;
   (b) a frame member removably mounted in said housing and having a central opening therein to permit the movement of bees therethrough.
   (c) an array of spaced electrical conductors extending across the opening in said frame member, said conductors being spaced to permit the passage of bees therethrough;
   (d) first access means opening adjacent to at least one wall of said housing member and positioned beneath said frame member to provide an external access path for bees in the colony;
   (e) means for establishing a voltage difference between adjacent conductors in said array whereby bees passing through said array from said first access means encounter adjacent conductors and are electrically sitmulated; and
   (f) collection means removably mounted in said housing member for withdrawal therefrom and located beneath said first access means and external access path, said collection means receiving venom from bees excited by contact with adjacent conductors in the spaced overlying frame member.

2. Apparatus in accordance with claim 1 wherein said frame member is provided with spaced guideways depending therefrom and extending below said first access means, said guideways providing support for said collection means.

3. Apparatus in accordance with claim 2 wherein said collection means further includes a fibrous pad spaced adjacent said array and a support base therefor.

4. Apparatus for the accumulation of bee venom, said apparatus being adapted for removable placement at first and second levels in a bee colony structure of the type having a vertical internal passage between the hive entrance and colony supers, said apparatus comprising:
   (a) frame means adapted for removable placement at a first level across said internal passage and containing an opening therein;
   (b) a multiplicity of spaced electrical conductors extending across said opening, said conductors being spaced to permit the passage of bees therebetween;
   (c) means for establishing a voltage difference between adjacent conductors whereby bees passing therebetween and encountering adjacent conductors are electrically stimulated;
   (d) collection means adapted for removable insertion in said structure at a second level and spaced beneath said conductors thereby forming a region for the passage of bees therebetween, said collection means receiving venom from bees stimulated by contact with adjacent conductors; and
   (e) means for providing external access for the bees in said colony and communicating with said region between said first and second levels.

5. Apparatus in accordance with claim 4 wherein said collection means includes a fibrous pad.

6. Apparatus in accordance with claim 5 wherein said frame means is provided with spaced guideways depending therefrom below said access means to the second level, said guideways removably receiving said collection means.

7. Apparatus in accordance with claim 6 wherein said electrical conductors are adjacently spaced by a distance which is less than the body length of a bee to promote contact with adjacent wires as bees pass therebetween.

8. Apparatus in accordance with claim 7 wherein the adjacent spacing of said conductors is approximately one-fourth inch.

* * * * *